United States Patent [19]

Sandler et al.

[11] Patent Number: 5,557,614

[45] Date of Patent: Sep. 17, 1996

[54] METHOD AND APPARATUS FOR FRAMING DATA IN A DIGITAL TRANSMISSION LINE

[75] Inventors: Lorin H. Sandler, Northbrook; Neal T. Wingen, Crystal Lake, both of Ill.

[73] Assignee: VLSI Technology, Inc., San Jose, Calif.

[21] Appl. No.: 172,458

[22] Filed: Dec. 22, 1993

[51] Int. Cl.$^6$ ...................................................... H04J 3/06
[52] U.S. Cl. ........................ 370/105; 370/105.1; 375/368
[58] Field of Search ................................. 370/84, 100.1, 370/105, 105.1, 106, 110.1, 105.2, 105.4, 79, 82, 112; 375/365, 366, 368

[56] References Cited

U.S. PATENT DOCUMENTS

| | | | |
|---|---|---|---|
| 4,316,284 | 2/1982 | Howson | 370/105 |
| 4,730,346 | 3/1988 | Jiang | 370/105 |
| 4,757,499 | 7/1988 | Gorshe | 370/110.1 |
| 4,847,877 | 7/1989 | Besseyre | 375/368 |
| 4,864,565 | 9/1989 | Schuster et al. | 370/105.1 |
| 5,010,559 | 4/1991 | O'Connor et al. | 375/368 |
| 5,077,735 | 12/1991 | Myung et al. | 370/110.1 |
| 5,301,195 | 4/1994 | Hasegawa | 375/368 |
| 5,317,572 | 5/1994 | Satoh | 370/105.1 |

OTHER PUBLICATIONS

"Alarm Indication Signal Requirements and Objectives," Nov. 1988, Bell Communications Research, TA-TSY-000191, Issue 1.
"Functional Criteria for the DS1 Interface Connector," Nov. 1988, Bell Communications Research, TA-TSY-000312, Issue 1.
"Transport Systems Generic Requirements (TSGR)", Dec. 1989, Bell Communications Research, TA-TSY-000499, Issuee 3.
"Digital Data Systems (DDS) -T1 Data Multiplexer (T1DM) Requirements, " Nov. 1985, Bell Communications Research, TA-TSY-000278, Issue 1.
"Digital Interface Between the SLC®96 Digital Loop Carrier System and a Local Digital Switch," Aug. 1987, Bell Communications Research, TA-TSY-000008, Issue 2.
"Digital Cross-Connect System Requirements and Objectives," Nov. 1985, Bell Communications Research, TA-TSY-000170, Issue 1.
"Digital Channel Bank Requirements and Objectives," Nov. 1982, American Telephone and Telegraph Company, PUB 43801.
"Accunet® T1.5 Service Description and Interface Specification," Dec. 1990, American Telephone and Telegraph Company, Technical Reference (62411).
"Requirements for Interfacing Digital Terminal Equipment to Service Employing the Extended Superframe Format," Sep. 1989, American Telephone and Telegraph Company, Technical Reference (PUB 54016).
"Digital Hierarchy-Electrical Interfaces," Approved Aug. 1987, American National Standards Institute, ANSI T1.102.1987.
"Carrier-to-Customer Installation-DS1 Metallic Interface," Approved Feb. 22, 1989, Americal National Standards Institute, ANSI T1.403.1989.

*Primary Examiner*—Benedict V. Safourek
*Assistant Examiner*—Chau T. Nguyen
*Attorney, Agent, or Firm*—Hickman Beyer & Weaver, LLP

[57] ABSTRACT

A method and apparatus for framing data in digital transmission lines automatically recognizes a framing format. The apparatus preferably includes a frame alignment apparatus that can recognize any one of a number of predetermined framing formats created by framing information on an input signal. The frame alignment apparatus outputs an aligning signal to an output frame counter, which counts the data and framing information on the input signal and outputs a frame synchronization signal according to the framing format. The input signal is also coupled to an output apparatus that outputs the input signal at the clock rate of a terminating apparatus. The frame alignment apparatus preferably includes a plurality of pattern recognizers able to recognize at least one of the framing formats and a storage apparatus for storing counts of successive data and framing information that match a framing pattern. The counts are preferably used to identify the flaming information on the input signal and the flaming format.

25 Claims, 6 Drawing Sheets

| ADDRESS (BIT STREAM #) | DATA | | | | | |
|---|---|---|---|---|---|---|
| | 25 | 24-20 | 19-15 | 14-10 | 9-5 | 4-0 |
| 0 | T1DM | ESF3 | ESF2 | ESF1 | ESF0 | SF |
| 1 | T1DM | ESF3 | ESF2 | ESF1 | ESF0 | SF |
| 2 | T1DM | ESF3 | ESF2 | ESF1 | ESF0 | SF |
| 3 | T1DM | ESF3 | ESF2 | ESF1 | ESF0 | SF |
| ⋮ | | | | | | |
| 192 | T1DM | ESF3 | ESF2 | ESF1 | ESF0 | SF |

METHOD AND APPARATUS FOR FRAMING DATA IN A DIGITAL TRANSMISSION LINE

BACKGROUND OF THE INVENTION

1. Field of the Invention

This invention relates to communication systems, and more particularly to the transmission and reception of digital signals.

2. Background of the Related Art

Communication systems are used to transmit and receive signals over a communication channel. One common form of communication system is a telephone system for transmitting and receiving voice and data signals.

FIG. 1 is a pictorial representation of a telephone communication system 10. Central office 11 sends telephone signals over wires 12 to central office 14. Similarly, central office 14 can send signals to central office 11 over wires 12. Wires 12 may be supported by poles 15, or may be buried. Individual homes and businesses are serviced directly or indirectly from a central office.

The telephone communication system 10 is preferably a digital communication system; i.e., digital signals representing digital data are sent over wires 12. Digital signals typically have greater capacity of information and less noise problems than analog signals. When carrying digital data, these wires 12 are often referred to as "T1" lines. The digital data carried by T1 lines can represent voice and other types of analog data, as well as purely digital information.

The data transmitted over wires 12 is typically organized according to a specific format so that receiving offices 11 and 14 are able to recognize and retrieve the data using the same format. In many digital telephone systems, data is organized into "frames." Frames are blocks of serial information that are transmitted consecutively, where each frame includes the same amount of data (bits). Bits of data in a frame are typically surrounded by framing information called framing bits, which indicate the beginning and/or end of a frame.

FIG. 2 shows an example of digital information that has been organized into a frame 16. In this example, 193 digital signals, or bits, numbered 0–192 are individual bits of digital data that have been transmitted serially over wires 12, each bit typically representing a 1 or 0 value. Bits 0–191 are data bits, representing, for example, voice data transmitted over wires 12. Typically, the voice data is organized into separate channels, 8 bits per channel, where each channel can be an individual telephone communication in, for example, the time division multiplexing (TDM) methodology. Thus, 24 channels can be represented in bits 0–191. Bit number 192 is a framing bit F, which is inserted after every 192 bits of voice data and marks the end of a frame of 24 channels of data.

FIG. 3 is a schematic view of several sequential frames 16 of data of FIG. 2. Each frame is transmitted directly following the preceding frame. Framing bits F1, F2, F3, etc. mark the end of their respective frames and form a "bit stream" of framing bits. Each framing bit can be set to a particular level (0 or 1) so that a number of framing bits examined collectively form a specific pattern. Since a receiver typically includes a framing apparatus programmed to examine incoming bits for a predetermined framing pattern, the receiver can find the framing bits and synchronize itself with the data to distinguish each channel in the frame; i.e. it will have correctly "framed" the data.

In addition to marking the beginning or end of frames in digital data, framing signals or bits can also be used to transmit signalling information. Specific framing bits are retrieved and information is extracted according to a standardized decoding method. Signalling information is typically used for operating procedures and servicing and includes phone receiver status (connection made), battery power level, and other service-type information.

In many telephone systems, a number of successive frames defines a "superframe". A framing apparatus in a receiver is typically programmed to examine signals over one or more superframes to distinguish the framing pattern and frame the data correctly. A commonly-used superframe 18 is 12 successive frames, as shown in FIG. 3.

Several different types of framing formats are used in telephone systems, since different systems may use varying signalling and framing structures. Some of the most widely-used formats include Superframe (SF), Extended Superframe (ESF), T1 Data Multiplexer (T1DM), and SLC-96.

SF format includes a superframe of 12 frames, each frame including 193 bits, totalling 2316 bits. One framing bit is placed at the end of each of the 193-bit frames to supply terminal framing, which identifies frame boundaries. Frames 6 and 12 also include signalling framing bits, which are used to send operating information independently of the voice channel bits (0–191).

ESF format extends SF format from 12 to 24 frames, totalling 4632 bits. A framing bit is positioned every 772 bits. The ESF format includes synchronization bits, error checking bits, and four signal bits.

T1DM format is a 193-bit format with one channel (i.e. sync byte), bits 185 through 192, forming an 8-bit synchronization pattern along with an alarm bit and a remote signalling bit. T1DM format uses framing bits in the SF format.

SLC-96 format is very similar to the SF format, including the framing bit which is time shared to supply terminal framing and signal framing. SLC-96 differs from SF in signal framing, which includes two signal channels and a serial datalink.

FIG. 4 is a schematic representation of a prior art receiving apparatus 20 used to frame incoming digital data and includes a clock and data recovery apparatus 22, a framing apparatus 24, and a terminating apparatus 26. With additional reference to FIG. 1, receiving apparatus 20 will typically be provided at receiving offices 11 and 14 or on a pole 15. Clock and data recovery apparatus 22 receives a signal from T1 line 12 and derives a clock signal 21 therefrom. This can be accomplished, for example, by oversampling, as is well known to those skilled in the art. The data signal 23 output of apparatus 22 retains the information contained in the original signal on T1 line 12. A framing apparatus 24 is coupled to the clock and data outputs of apparatus 22 to "frame" the data according to a predetermined frame format. Framing apparatus 24 is connected to a terminating apparatus 26. Terminating apparatus 26 is typically processing equipment such as a performance monitor, another framing apparatus, a routing mechanism, etc. that requires or further processes a framed data signal.

Framing apparatus 24 typically has three outputs. One output is the data signal 25, which is output at the frequency of a clock signal 27. Clock signal 27 is output by terminating apparatus 26 and is used to compensate for any differences in frequency between clock signal 21 and the clock of terminating apparatus 26. A second output of framing apparatus 24 is a frame synchronization signal 28, which tells the terminating apparatus the location of the framing bits in the data signal 23. A third output is signal line 29, which contains the signalling information extracted from the framing bits. Framing apparatus 24 also typically includes error-checking components that monitor the data signal and indicate when framing errors occur.

A problem with the prior art framing apparatus occurs due to the inflexibility of the apparatus to frame data according to different types of framing formats. A typical framing apparatus can frame data according to only one particular framing format without operator input. However, the framing formats used on a particular telephone system are typically changed to other formats when different telephone systems use the same wires 12. If the framing format is changed, a signal must be sent by an operator to a controller inside the framing apparatus indicating that the framing format has changed. Some systems might require an operator to go out to the location of the framing apparatus and switch formats manually with switches, etc. This can be both inconvenient and time consuming, and allows little flexibility in changing framing formats quickly.

Another problem with prior art framing apparatus is the cost and equipment needed to frame data on multiple T1 lines. Often, two or more T1 lines are grouped together to send more digital information or to send digital information at a faster rate; such line combinations are designated "T2", "T3", etc. The prior art apparatus typically must dedicate a single apparatus to each T1 line, so that several apparatus are required to frame multiple T1 lines. The cost of framing multiple T1 lines thus is increased with the addition of more framing apparatus.

What is needed is an apparatus and method that will quickly, conveniently and automatically frame data on a digital transmission line according to several possible different framing formats. What is further needed is an apparatus that will frame data on multiple T1 lines without requiring substantial additional equipment and cost.

SUMMARY OF INVENTION

The present invention addresses the problems in the prior art by providing a method and apparatus for framing data in digital communication systems. A framing apparatus is provided that uses a frame alignment apparatus that preferably includes pattern recognizers for recognizing a pattern created by framing information on an input data signal. A frame storage apparatus is used to store a count for each bit stream in a frame that matches the pattern to find the framing information.

In the present invention, an input signal including data and framing information is input to a buffer that outputs a signal, derived from said input signal, that includes the data and framing information from the original input signal. The input signal is also coupled to a frame alignment apparatus that can recognize any one of a number of predetermined framing formats created by the framing information. When a framing format is recognized on the input signal, an aligning signal is output from the frame alignment apparatus to an output frame counter. The output frame counter counts the data and framing information on the data signal and outputs a frame synchronization signal according to the framing format. Preferably, the output counter outputs a frame synchronization signal corresponding to each individual framing bit of the framing information.

The frame alignment apparatus of the present invention preferably includes a plurality of pattern recognizers, each pattern recognizer able to recognize at least one of the framing formats. The pattern recognizers preferably store several counts for bit streams that match a framing pattern for a particular frame format in a storage apparatus. The bit stream that includes the most successive bits that match a framing pattern increments a specific count to the highest value; this count preferably reaches an in-frame threshhold first and identifies the framing bit stream. The framing format is known by the framing pattern that was matched to the bit stream.

The framing apparatus of the present invention preferably includes a frame follower apparatus, which includes an input frame counter and a frame monitor. The input frame counter provides a frame reference signal to the frame monitor, which checks the input signal for framing errors. The framing apparatus of the present invention also preferably includes signal extract circuitry, which extracts and outputs signalling information from the framing information on the input signal.

The present invention has the advantage of automatically recognizing any one of several framing formats that may be present in an input signal. The framing apparatus can recognize and frame data without being informed of the framing format.

The present invention also has the advantage of using a small amount of memory to keep track of bit streams on the input signal. Only a count of successive bits that match a framing pattern are stored in memory, not the bits themselves, thus substantially reducing the amount of memory used. Furthermore, the present invention has the advantage of framing multiple digital signals without duplicating components of the frame alignment apparatus, saving time and expense.

These and other advantages of the present invention will become apparent to those skilled in the art after reading the following descriptions and studying the various figures of the drawings.

DETAILED DESCRIPTION OF THE PREFERRED EMBODIMENTS

Figure 1:
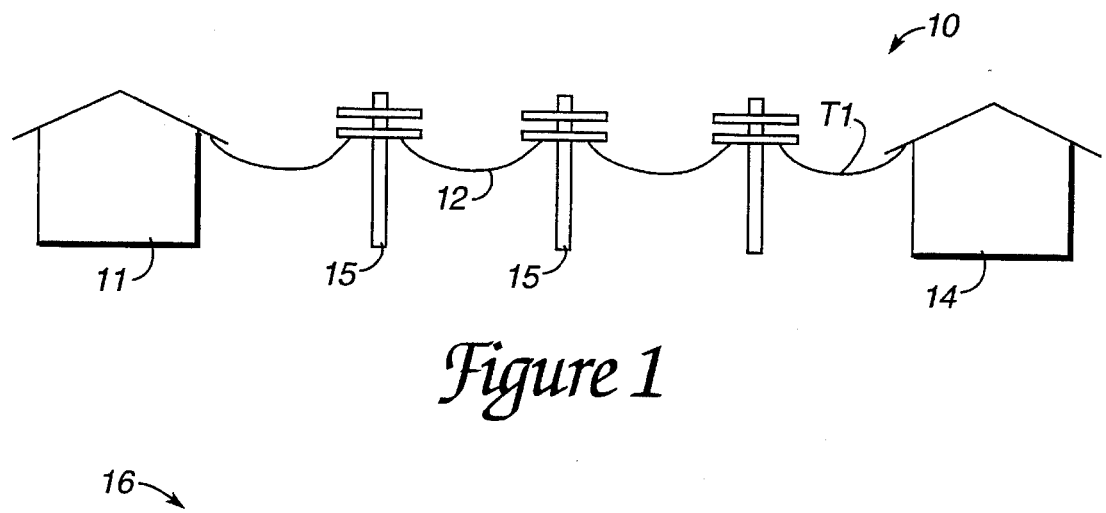
FIG. 1 is a pictorial representation of a communication system which serves as the environment for the present invention.
Figure 2:
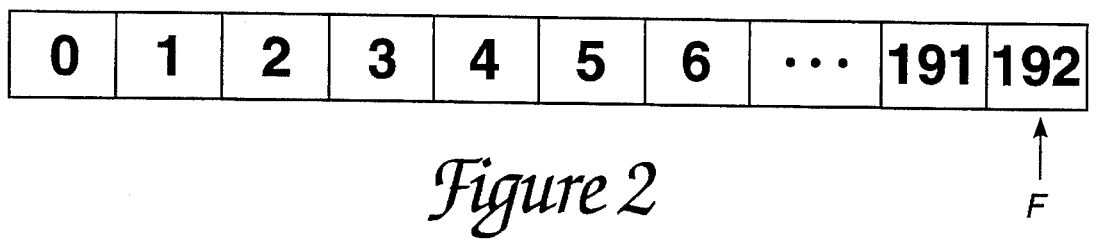
FIG. 2 is a diagram of a frame of data.
Figure 3:
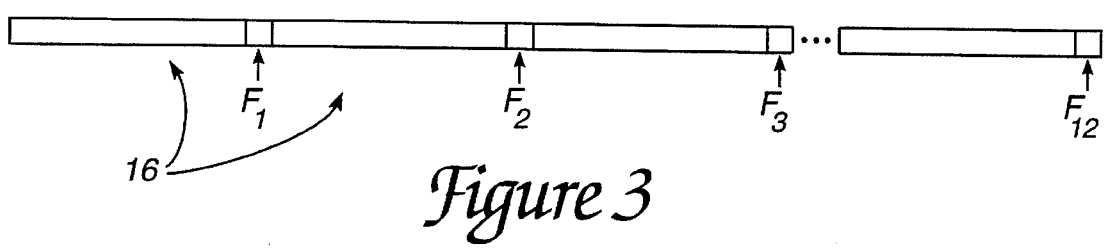
FIG. 3 is a diagram of several successive frames of data.

FIGS. 1, 2, 3, and 4 were discussed in the "Background of the Invention" section of this specification. FIG. 5 is a block diagram of a framing apparatus 30 in accordance with the present invention which replaces the prior art framing apparatus 24 illustrated in FIG. 4. Framing apparatus 30 preferably includes a frame aligner 32, a frame random access memory (RAM) 34, an elastic store circuit 36, a frame follower 38, control registers 40, a microprocessor 41 and an output block 42.

Figure 4:
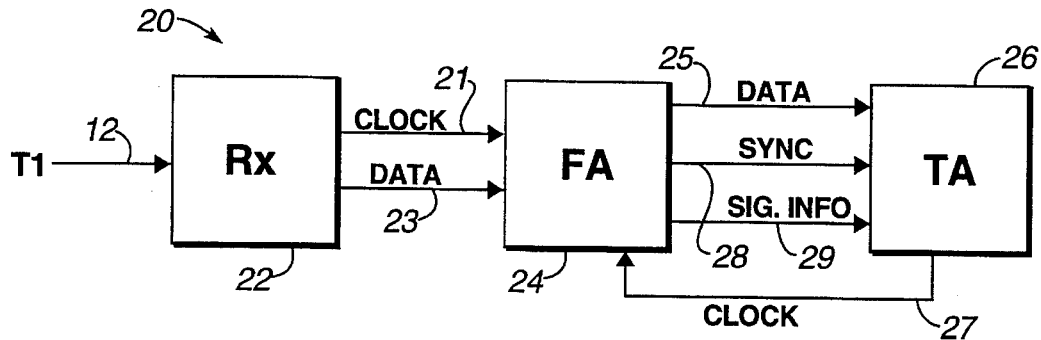
FIG. 4 is a block diagram of a prior art clock and data recovery apparatus, framing apparatus, and terminating apparatus.
Figure 5:
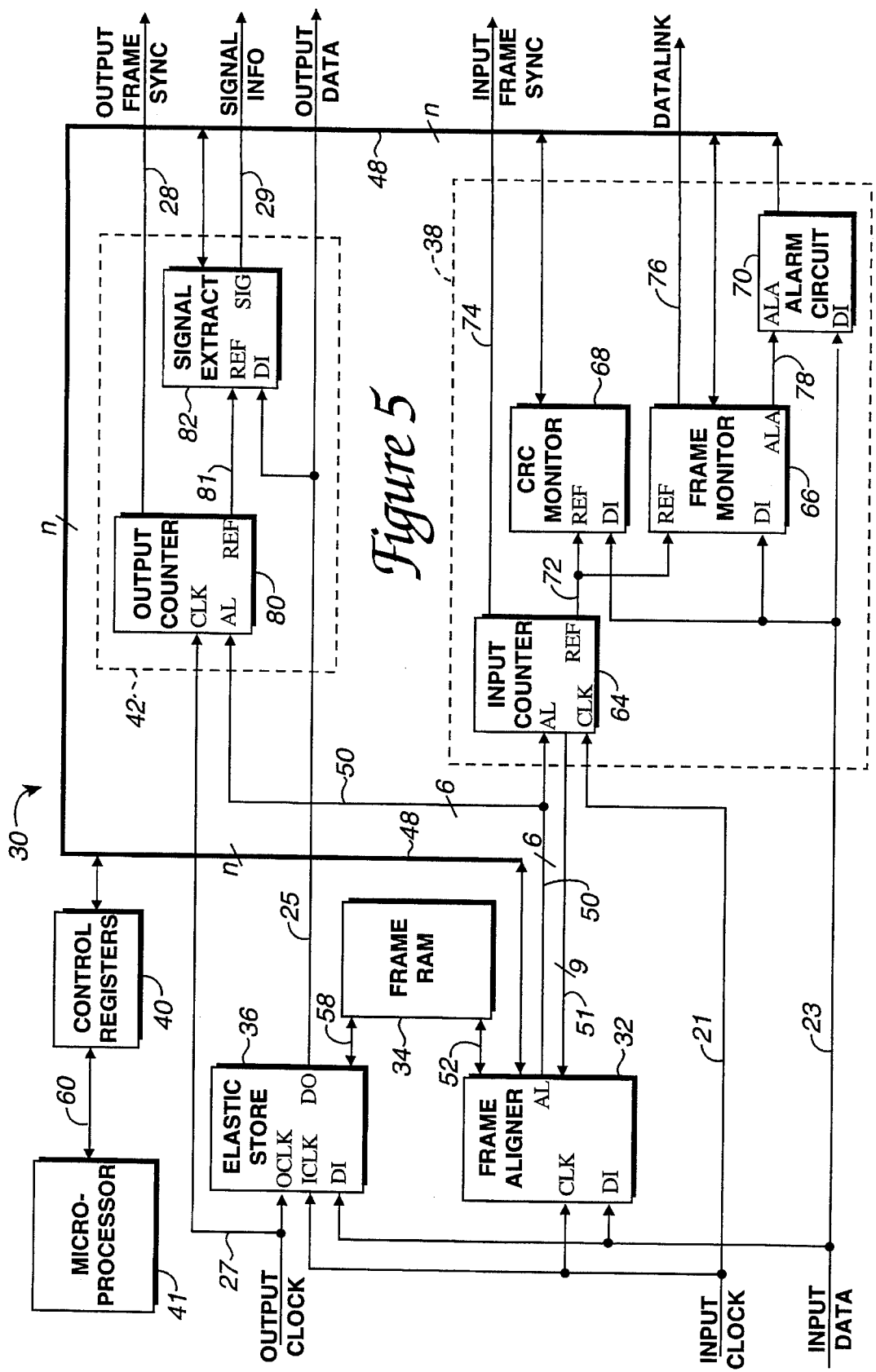
FIG. 5 is a block diagram of a framing apparatus of the present invention.

Frame aligner 32 is coupled to an input data signal line 23 at a DI port and an input clock signal line 21 at a CLK port which provide an input data signal and an input clock, respectively, from a clock and data recovery apparatus 22 (FIG. 4). Frame aligner 32 is also coupled to a status bus 48 which sends and receives status signals to and from the microprocessor 41 (described below). A frame aligning signal for synchronizing framing information is output from frame aligner at an AL port on bus 50 to the frame follower 38 and the output block 42. Frame aligner 32 preferably includes several components, including state machines, multiplexers, demultiplexers, magnitude comparators, and controllers, and is described in greater detail with reference to FIG. 6.

Frame RAM 34 is coupled to frame aligner 32 by an address/data/control bus 152. Frame RAM 34 is, for example, a 193×26 sized RAM that preferably functions as a storage mechanism for frame aligner 32. Frame RAM 34 also preferably functions as a buffer for elastic store circuit 36. Other storage apparatus can also be used for frame RAM 34.

The frame aligner 32 and frame RAM 34 can be collectively considered a "frame alignment apparatus" in accordance with the present invention, since they cooperate to frame data on the input data signal on line 23.

Elastic store circuit 36 is coupled to input clock line 21 at an ICLK port, input data line 23 at a DI port, and output clock line 27 at an OCLK port. An output data signal from a DO port on output data line 25 is output to terminating apparatus 26, and control signals are output to status bus 48. Elastic store circuit 36 is also coupled to frame RAM 34 by an address/data/control bus 58, and receives REF signals on lines 72 and 81 from frame counters 64 and 80 (detailed with reference to FIG. 8). The output clock on line 27 is output by terminating apparatus 26 (shown in FIG. 4). Preferably, the components of elastic store circuit 36 include control circuitry that control reading and writing data to frame RAM 34 over bus 58 to "elastically" buffer the input data. Elastic store circuit 36 is detailed with reference to FIG. 8.

Control registers 40 are coupled to the status bus 48 and to a data bus 60. Data bus 60 is preferably coupled to microprocessor 41 or equivalent digital controller. The microprocessor can send and receive data on the status bus 48 through the use of the control registers to monitor and control components of the framing apparatus 30. Microprocessor 41 is preferably connected to a user interface (not shown), such as a display screen, LED display, or similar device, for displaying different status signals of the apparatus 30 to an operator by techniques well known to those skilled in the art.

Frame follower 38 preferably includes input frame counter 64, frame monitor 66, CRC monitor 68, and alarm logic 70. Input frame counter 64 is, for example, a 15-bit counter that counts according to the input clock signal received at a CLK port from line 21. Input frame counter receives a frame aligning signal from frame aligner on bus 50 at an AL port. A frame reference signal is output from frame counter 64 from a REF port on bus 72. A frame information signal is also output to frame aligner 32 on bus 51, which is, for example, a 9-bit bus. Input frame counter 64 also preferably outputs an input frame synchronization signal on line 74 which provides the location of framing bits on the input data line 23 and is coupled to terminating apparatus 26 for operator reference.

Frame monitor 66 receives the frame reference signal on bus 72 from input frame counter 64 at a REF port and also receives the original input data signal on line 23 at a D1 port. Frame monitor 66 is coupled to status bus 48 and outputs two other signals: a datalink signal on line 76 connected to a user interface device or terminating apparatus 26, and an alarm signal from an ALA port on line 78. Alarm logic 70 receives the input data signal on line 23 at a D1 port and the alarm signal from frame monitor 66 at an ALA port. Alarm logic 70 outputs an alarm status signal to status bus 48. CRC monitor 68 is coupled to the input data line 23 at a D1 port and the reference bus 72 from the input frame counter at a REF port. CRC monitor 68 outputs status signals on status bus 48 indicating the results of a cyclic redundancy check.

Output block 42 includes an output frame counter 80 and a signal extract circuit 82. Output frame counter 80 receives the output clock 27 derived from terminating apparatus 26 as shown in FIG. 4 at a CLK port and the AL signal from frame aligner 32. Output frame counter 80 outputs a frame reference signal from a REF port on line 81 to signal extract circuitry 82 and an output frame synchronization signal on line 28 to terminating apparatus 26. Signal extract circuitry 82 receives the frame reference signal from the output counter at a REF port and also receives the output data signal on line 25 from the elastic store circuit 36 at a DI port. Signal extract circuit 82 outputs extracted signalling information from a SIG port on line 29, which is connected to terminal apparatus 26.

The operation of the preferred embodiment of framing apparatus 30 is described as follows. Frame aligner 32 receives the input data signal on line 23 at a DI port and the clock signal on line 21 at a CLK port. The clock signal is derived from the input data signal by prior art clock and data recovery apparatus 22. The input data signal preferably contains Time Division Multiplexed (TDM) data, i.e. data that is organized into successive frames such that a number of data bits are strung together in a frame, and at least one framing bit marks the end of the frame and the beginning of a new frame. In the present invention, data and framing bits are considered "data and framing information", and the framing information includes at least one framing bit. The data is preferably modulated to a pulse code modulation (PCM) scheme. The input data signal is preferably sent to a number of pattern recognizers within the frame aligner to distinguish a framing format in the input data signal, as described below. This recognized framing format is output on status bus 48, and a frame aligning signal is output on bus 50 to other components in the framing apparatus 30.

Figure 6:
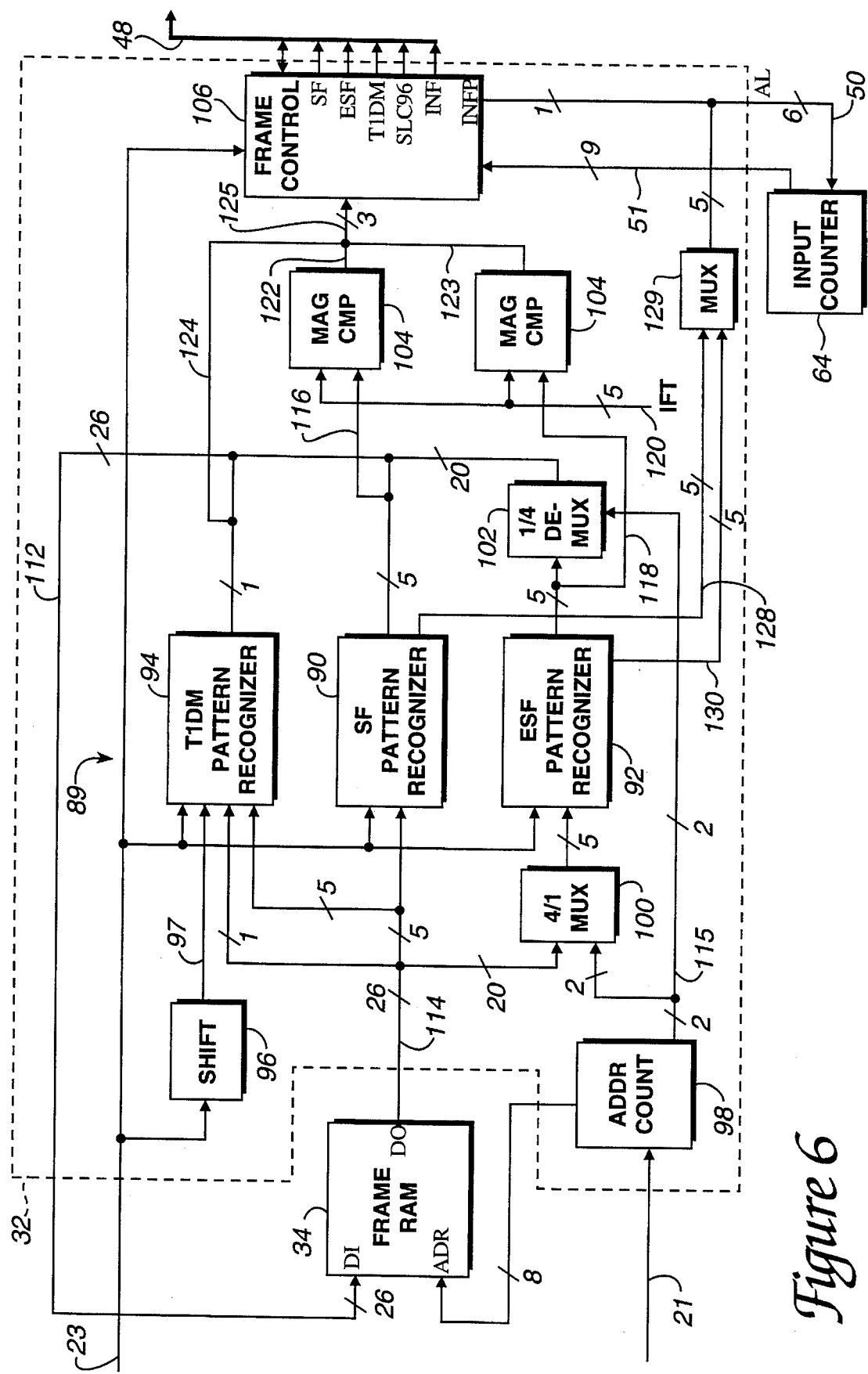
FIG. 6 is a block diagram of a preferred frame alignment apparatus of the present invention.

FIG. 6 is a schematic diagram of the preferred frame alignment apparatus, including frame aligner 32 and frame RAM 34, used in the present invention. Frame aligner 32 includes pattern recognizers 89, shift register 96, address counter 98, multiplexer 100, demultiplexer 102, magnitude comparators 104, and frame controller 106. In the described embodiment, the pattern recognizers include SF pattern recognizer 90, ESF pattern recognizer 92, and T1DM pattern recognizer 94, which are designed to look for the commonly-used SF, ESF, T1DM, and SLC96 framing formats. Other framing formats and pattern recognizers can, of course, also be used.

The input data signal is input on line 23 and sent to the pattern recognizers 89, each of which compares the information on the input signal to a specific framing pattern. For example, SF pattern recognizer 90 examines each of the 193 bit streams in a frame over successive frames to look for a particular SF framing pattern. Herein, a "bit stream" is defined as a string of bits in an nth position in successive frames. For example, the 4th bit of each successive frame, when grouped together, forms a bit stream: bit stream number 4. Thus, each of the bits in a frame forms its own bit stream over successive frames. One of the bit streams of a frame is the framing bit stream, which includes all the framing bits.

The frame aligner 32 assumes that each one of the bit streams in a frame might be the framing bit stream, and each bit stream is checked if it matches a framing pattern. The bit stream that corresponds to the pattern is the framing bit stream.

A framing pattern includes predefined values that the pattern recognizer compares to successive bits in a bit stream. For example, for the SF pattern recognizer 90, the SF framing pattern is 12 bits: 100011011100. This is a standard pattern that all SF framing apparatus must use to frame data. In the present invention, the bits of each particular bit stream are examined, and if successive bits match the pattern, a count in frame RAM 34 is incremented for each bit. Several different count values for each of the pattern recognizers 89 are stored in frame RAM 34 (described with reference to FIG. 7); the first bit stream to increment a count to a predetermined value is the framing bit stream (described subsequently).

The preferred logic instructions followed by SF pattern recognizer 90 are shown in Appendix A. Logic instructions used for the pattern recognizers 89 are preferably implemented using a state machine description file and, for example, the programming language Abel or the COMPASS Logic Synthesizer by COMPASS Design Automation, which are well known to those skilled in the art. The logic is implemented with well-known logic gates.

The first 24 lines shown in Appendix A show how, in this described embodiment, the count in RAM 34 is incremented if the bits of a bit stream match the SF framing pattern. If the current input bit and the count in RAM 34 have certain values, a new incremented count value is output from SF pattern recognizer 90 and stored in place of the old count value. For example, line 1 indicates that if an input signal bit (INP) has a value of 1, and if the count in RAM (SF) is 0, then an incremented count of 1 (NEWSF) is output from the pattern recognizer 90 to the RAM 34 and a count of 1 (F) is output to frame counters 64 and 80 on 5-bit bus 128. Line 2 indicates that if the next bit (INP) is 0 and the SF count in RAM is 1, then an incremented count of 2 is output from the pattern recognizer to be stored in RAM 34. Likewise, successive bits are examined; if the current input bit value corresponds to the SF pattern, and the count in RAM indicates that the previous bit in the bit stream also matched the pattern, then the count is incremented.

A count in RAM 34 is incremented from 0 to 23 (see NEW__SF) before it is reset to zero again. The maximum count value depends on the size of frame RAM 34 (described with reference to FIG. 7). The F output, however, is incremented to only 12 before it is reset to one. This is because the F output represents the frame number, which in SF format ranges from 1 to 12 (12 frames equalling a superframe). The frame number F is loaded into frame counters 64 and 80 so that the counters can synchronize other components (described subsequently). Of course, the frame number F is incremented to other maximum values in other framing formats besides SF.

Lines 25–48 shown in Appendix A describe how the count in RAM 34 is set if a bit does not match a value of the framing pattern. If a bit does not match the pattern, the count in RAM 34 (NEW__SF) is reset to zero (or 1) and must be incremented from zero once again, since successive bits must match the framing pattern. For example, if the current input bit INP is 0 and the count value SF is 5 (line 30), the bit does not match the framing pattern and the count in RAM is reset to 0 (NEW__SF). If the next bit is a one (as shown in line 1 above ), the count is incremented to 1, and the pattern matching begins once again.

As shown in lines 25–48, if an input bit value (INP) is 0 and the count value does not match the pattern, the count value is reset to zero. If a bit value is 1 and the count value does not match the pattern, the count value is reset to one. The count is reset to one in the latter case so that the one value will not be lost; the framing pattern begins with a 1, and the current bit is now the starting bit of the incoming bit stream.

The SF pattern recognizer 90 is also used to recognize SLC6 frame formats on input data line 23. The SLC-96 format uses framing bits in the same pattern as the SF format, and differs only in signalling information. Once an input signal is aligned to an SF format, the frame controller 106 (see below) checks if there are "spoiler bits" present in predetermined bit positions of the input data signal. If spoiler bits are confirmed, the data is declared to be in the SLC-96 framing format (explained with reference to FIG. 9).

Logic instructions for a preferred ESF pattern recognizer 92 of the present invention are shown in Appendix B. ESF pattern recognizer 92 is preferably similar to SF pattern recognizer 90 in implementation and operation. The standard ESF pattern is 001011, repeated continuously. Lines 1–24 show how a count is incremented if the bits of a bit stream match the framing pattern. The input bit (INP) and retrieved count value (ESF) are compared to the pattern; if they match, a new count value (NEW__ESF) is stored back in RAM 34 and a frame number (F) is sent to frame counters 64 and 80 on 5-bit bus 130. Lines 25–48 show how the count in RAM 34 is reset when a bit does not match the ESF framing pattern. If a 1 bit does not match the pattern, the count is reset to zero. If a 0 bit does not match the pattern, the count is reset to 1 or 2. Similar to the SF format, the count is set to 1 or 2 in the latter case to keep the 0 bit values as starting values of a newly-begun pattern, since the ESF framing pattern begins with two zeros.

Logic instructions for a preferred T1DM pattern recognizer 94 of the present invention are shown in Appendix C. T1DM pattern recognizer 94 operates differently than the other pattern recognizers 89. Only one bit in frame RAM 34 is used for the T1DM format. T1DM format uses the same framing bits as the SF format, and in addition uses the last 8 bits in a frame, i.e. the sync byte. The T1DM pattern recognizer logic uses four inputs to determine an output. INP is the current input bit, SYNC is a bit sent from shift register 96 (explained below), T1DM is the bit retrieved from RAM 34, SF is the count stored in the SF pattern recognizer section in RAM 34 (bits 0–4), and NEW__T1DM is the output signal stored back into RAM 34 and also sent to frame controller 106. The NEW__T1DM signal is one if an SF framing pattern is detected (as shown by the SF and INP values in lines 1–8) and if the shift register recognizes a specific pattern for a sync byte (as shown by the SYNC value). If no condition specified by the logic instructions is met, the T1DM pattern recognizer outputs a default NEW__T1DM value of 0.

The logic instructions for the pattern recognizers 89 can be implemented in other ways. For example, a controller can be used to implement the logic according to a programmed algorithm.

Figures 7, 8:
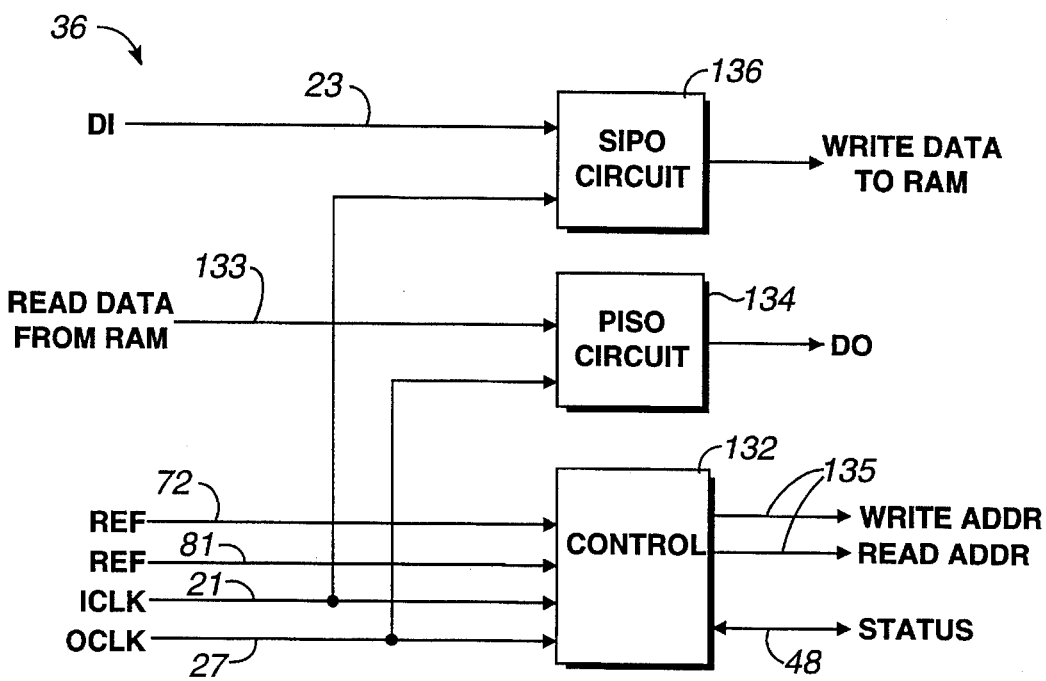
FIG. 7 is a diagram of the contents of the frame RAM.
FIG. 8 is a block diagram of an elastic store circuit of the present invention.

FIG. 7 is a table 110 showing the preferred organization of frame RAM 34. The table is organized into addresses (rows) 0–192; each address corresponds to a bit stream number in a frame. For each address, preferably 26 bits of data may be stored. These 26 bits are divided into three sections. Bits 0–4 are used for the SF and SLC-96 formats; bits 5–24 are used for the ESF format; and bit 25 is used for the T1DM format. Each section stores the count of the number of successive bits in a particular bit stream that correspond to the framing pattern for that format. For example, bits (columns) 0–4 store the counts of the number of successive bits that match the SF framing pattern for all the bit streams. Thus, the count for bit stream number 0 of the frame for the SF frame format can be stored at address 0, bits 0–4. Likewise, the count of bits in bit stream 0 that correspond to the ESF pattern are stored in bits 5–9 (the use of bits 10–25 are explained below).

Five bits are allowed for each count in the preferred embodiment, allowing a maximum count of 32. A different number of bits can also be used, depending on how large a count value is desired by the operator. In the preferred embodiment, the maximum count is 24 before the pattern recognizers reset the count to zero.

The ESF format preferably uses bits 5–24 of the frame RAM. The ESF format includes frames having 772 bits. Since ESF includes frames that are four times the size of normal SF frames of 193 bits each, four times the bits used in the SF format are required to store counts for the ESF format in this preferred embodiment. ESF bits 5–24 of table 110 are preferably organized into four sections of five bits each: ESF0 (bits 5–9), ESF1 (bits 10–14), ESF2 (bits 15–19) and ESF3 (bits 20–24). Each section stores the count for 193 bit streams; thus, the ESF0 section stores the count for bit stream numbers 0–192, the ESF1 section stores the counts for bit stream numbers 193–385, the ESF2 section stores the counts for bit stream numbers 386–578, and ESF3 stores counts for bit stream numbers 579–771.

The T1DM format preferably uses one bit (column) in RAM 34: bit 25. This bit stores the status resulting from the logic described in Appendix C. If shift register 96 sends a SYNC signal (described below) and an input bit matches the SF pattern, bit 25 of RAM 34 is set to one. Bit 25 is thus zero before a sync byte has been recognized and before an input bit has a value of 1 (the first value in the SF format), or after an out-of-frame (OOF) condition occurs (explained below).

In other embodiments, other formats can also be stored in frame RAM 34. A number of bit locations in the RAM can be set aside to count bits for a different format instead of one of the formats described above. A larger RAM can also be used to accomodate additional formats.

Referring back to FIG. 6, if an input bit's value (0 or 1) matches a corresponding value of the framing pattern, a pattern recognizer 89 receives a count value from RAM 34 corresponding to the bit stream and sends an incremented count value on bus 112 to RAM 34 for storage in place of the old count value. For example, the SF pattern recognizer increments the count stored in the frame RAM at address 1, bits 0–4 if the first input bit's value matches the first pattern value.

Address counter 98 increments a count corresponding to an address value in frame RAM 34 according to the input clock signal on line 21. In the preferred embodiment, address counter 98 is a 10-bit counter that counts from 0–772. The 8 least-significant bits of the address counter 98 increment the address in RAM 34 for each input bit and resets to zero after bit number 192 is input.

In the described embodiment, RAM 34 outputs a 26-bit number on bus 114. One of the bits is sent to the T1DM pattern recognizer 94, five of the bits are sent to the SF pattern recognizer 90 and to the T1DM pattern recognizer 94, and 20 of the bits are sent to the ESF pattern recognizer 92. For the ESF pattern recognizer, a 4/1 multiplexer 100 is used to select the 5 bits that contain the count for a particular bit stream out of the 20 bits used in the RAM. The 4/1 multiplexer is controlled by the 2 most-significant bits of the address counter 98 on bus 115 to select a particular 5 bits out of the 20 bits. For example, if the count value for bit stream number 230 stored in section ESF1 is being input to ESF pattern recognizer 92, then bits 10–14 out of the 20 bits being input are selected by 4/1 multiplexer 100 and input to the ESF pattern recognizer. Similary, a 1/4 demultiplexer 102 is used on the output of ESF pattern recognizer 92 so that the 5-bit NEW_ESF count value is converted back into a 20 bit number for storage in RAM 34. Demultiplexer 102 is preferably controlled by the 2-bit bus 115.

Shift register 96 preferably sends a SYNC signal to T1DM pattern recognizer 94 on line 97. Shift register 96, which preferably includes a 9-bit shift register, examines 8 bits of data at a time from line 23. The shift register includes comparator logic that compares the 8 bits to a predetermined T1DM "sync word", which is 10111XX0 ("X"="don't care"). If the pattern matches, shift register 96 outputs the SYNC signal on line 97 to T1DM pattern recognizer 94. The T1DM pattern recognizer then uses the logic instructions shown in Appendix C to analyze the current input bit. If the SYNC signal is received and if the input data matches the SF framing pattern, then the T1DM pattern recognizer sets bit 25 in RAM and sends out a signal on line 124. Shift register 96 will continue to shift in a bit at a time and compare eight bits to the sync word. The SYNC signal is also input to frame controller 106 (not shown). Shift registers are well-known to those skilled in the art.

If successive bits in a bit stream exactly correspond to a framing pattern, the count for that bit stream is incremented for each bit until the maximum count is reached (24 in the described embodiment) and the count is reset to zero. In the preferred embodiment, the count that first reaches a predetermined number, i.e. the "in-frame threshhold", represents the framing bit stream, since several successive bits of that bit stream corresponded exactly to the pattern. The in-frame threshhold (IFT) is the number of successive frames that are checked to determine if a match occurs between a bit stream and a framing pattern. Typically, a bit stream is examined over 12 or more frames to determine if it corresponds to the framing pattern (IFT=12). For example, if the IFT=12, and if the SF count for bit stream number 50 in RAM 34 first reaches a value of 12, then bit stream number 50 is the framing bit stream. None of the other counts in RAM are that high at that time, since in all likelihood the other bit streams would not correspond exactly to the framing pattern and their counts were reset at some previous time. The framing bit stream is thus identified and the framing format recognized.

The counts output from pattern recognizers 89 are compared to the IFT using magnitude comparators 104. SF pattern recognizer 90 sends the NEW_SF count value on bus 116 to magnitude comparator 104. ESF pattern recognizer 92 sends the NEW_ESF count value on bus 118 to a similar magnitude comparator 104. IFT signal on bus 120 is input to each of the magnitude comparators 104. If the NEW-SF or the NEW_ESF count values equal or exceed the IFT value, a high signal ("candidate pulse") is output on respective lines 122 or 123, indicating that the framing bit stream has been found. The IFT value is typically set at a value of 12, but may be adjusted by the operator from 1 to 24 in the preferred embodiment. Since frames in the ESF format include four times the number of bits used in SF format frames, four times as many bits must pass through ESF pattern recognizer 92 than the SF pattern recognizer 90 before the IFT for ESF is reached.

The T1DM pattern recognizer 94 sends out the NEW_T1DM signal on line 124. This candidate pulse signal is input to frame controller 106 as CANPT1DM.

Lines 122, 123, and 124 are combined into a 3-bit bus 125 that is sent into the frame controller 106. Frame controller 106 examines the candidate pulse signals on bus 125 to determine which framing format has been matched to the input data signal. If line 123 contains a high signal, then the input data has been matched to the ESF format. If both lines 122 and 124 are high, a T1DM framing format is indicated. If line 122 is high and line 124 is low, then the frame controller examines the input data on line 23 to determine if an SLC-96 format is present. If no SLC-96 is present, an SF format is indicated. Frame controller 106 is preferably implemented with state machines, and is described in greater detail with reference to FIG. 9.

In the preferred embodiment, certain formats can be disabled by an operator. Microprocessor 41 is programmed to disable one or more formats, and sends a signal on status bus 48 to the frame controller 106 (described with reference to FIG. 9). Frame controller 106 then will not declare alignment to a certain format if that format is disabled.

Frame controller 106 outputs the appropriate signals onto the status bus 48, which relays the recognized framing format to microprocessor 41. Frame controller 106 also outputs an in-frame (INF) signal to the microprocessor via the status bus indicating that the input data signal has been framed.

Due to random bits or signal errors, two formats may occasionally be simultaneously declared for the input data signal (i.e., the IFT may be reached or exceeded by two counts in RAM 34 simultaneously). If this occurs, frame controller 106 preferably sends a signal on status bus 48 indicating that two framing formats have been matched to the data (a "mimic framing pattern"). This is provided as diagnostic signals to the operator of the system.

Frame controller 106 also receives frame information signals on bus 51 from input counter 64, including, for example, a 5-bit frame number (F), a 2-bit superframe number (SF), a 1-bit frame pulse (FP) and a 1-bit superframe pulse (SFP). Frame controller 106 uses these signals to frame the input data, as described with reference to FIG. 9. Frame controller 106 outputs a frame aligning signal INFP, which is a single high pulse. Multiplexer 129 selects one of the busses 128 or 130 from pattern recognizers 89 that contains frame number (F) data using control signals (not shown) from the frame controller 106. The selected 5-bit frame number F and the INFP signal are combined into a 6-bit bus 50 which is output from the AL port of the frame aligner. Bus 50 is coupled to input frame counter 64 and output frame counter 80 as shown in FIG. 5.

Referring to FIG. 5, input frame counter 64 of frame follower 38 receives a frame aligning signal on bus 50 from frame aligner 32. One of the bits of bus 50, the frame aligning signal, is used to set the counter to zero, indicating that a framing bit has been detected in the input data and that the counter should begin incrementing from zero. Input frame counter is, for example, a 15-bit counter that uses the least significant 8 bits to count the bit number of the current frame, resetting to zero when it reaches 192. Each time input frame counter 64 resets (i.e., has counted to 192), a signal is sent out on line 74 as the input frame synchronization signal. This signal provides framing bit reference, as timed by the input clock on line 21, for the operator of the system.

Bus 50 also includes a 5-bit frame number F from one of the pattern recognizers 89. The frame number F is the current frame number of the input data signal and is, for example, stored in 5 bits of the 15-bit counter 64. The frame number thus increments every time the least significant 8 bits count to 192. The input frame counter will continue to count the frames and superframes of the input data after the pattern recognizers stop outputting frame numbers F. In the described embodiment, input counter 64 also counts superframe numbers from one to four in the most significant 2 bits of the 15 bits. Well-known logic is used in counter 64 to increment the superframe count for every 12 frames counted (the superframe number can be incremented for a different amount of counted frames in other embodiments). The superframe number and frame number are output by input frame counter 64 to frame aligner 32 on bus 51 (used by the frame controller 106 as described with reference to FIG. 9). Frame number and bit number are output by counter 64 as a frame reference signal REF on bus 72.

The frame number F is a number from 1 to 12 in the SF, SLC-96, and T1DM formats. In those formats, framing bits and signalling information is examined over 12 frames, or 1 superframe. In the ESF format, the F number output from ESF pattern recognizer 92 has a value of 4, 8, 12, 16, 20, or 24. This is because frame numbers are still counted in 193-bit sizes in the frame counter 64 for the ESF format, and for every framing bit counted in ESF format, four 193-bit frames have passed through the framing apparatus 30. The F value may reach 24 because a superframe has 24 frames rather than 12 in the ESF format.

Frame monitor 66 receives the frame reference signal from frame counter 64 indicating the current bit number and frame number of the input data. Frame monitor 66 checks the input data signal for framing errors; i.e. if a framing bit should occur as the 192nd bit instead of the 193rd, an error has occurred. To check for errors, the frame monitor requires a signal over status bus 48 from microprocessor 41 indicating which framing format has been recognized on the input signal. Preferably, frame monitor 66 is set by the user to declare a framing error when a predefined condition in the data occurs. For example, the frame monitor can be set to declare that the signal is out of frame if a fraction of framing bits in error is 2 out of 4, 2 out of 5, etc. The frame monitor also outputs status signals on the status bus, including an out-of-frame pulse (OOFP) when framing errors have occurred. The microprocessor receives an OOFP signal and controls the frame aligner 32 to frame the data again.

Other types of signals can be set up to indicate commonplace or serious errors, or special types of "alarms" that can be included in the framing bits or other bits in the input data signal. For example, a yellow alarm is indicated in the SF format after 256 successive bits in bit stream number 2 are 0. A datalink signal, indicating alarm and error status, can also be output from frame monitor 66 for operator reference. Techniques and apparatus for monitoring digital input data and declaring errors and alarms are well known to those skilled in the art.

Alarm logic 70 and CRC monitor 68 are additional error-checking components in frame follower 38. These components output status signals on the status bus 48 indicating the status of specific errors. Alarm logic 70 checks a data signal for alarms as described in the above paragraph. CRC monitor extracts a cyclical redundancy check number from the input data and calculates a similar number for comparison; if the numbers do not match a CRC error is indicated to the microprocessor 41 on status bus 48 (CRC monitor 66 is only used in ESF format). These components and their functions are well known to those skilled in the art.

FIG. 8 is a block diagram of a preferred elastic store circuit used in the described embodiment. Elastic store circuit includes control circuitry 132, Parallel In/Serial Out (PISO) circuit 134, and Serial In/Parallel Out (SIPO) circuit 136. PISO's and SIPO's are well known to those skilled in the art. After an in-frame condition has been achieved by frame aligner 32, frame RAM 34 is no longer needed as a storage area for counts in frame aligner 32. Elastic store circuit 36 then preferably uses frame RAM 34 as a buffer to synchronize the rate of the input data signal with the rate of output clock on line 27 received by terminating apparatus 26. Frame RAM 34 is preferably used to store 2 frames of data from input data line 23.

In FIG. 8, input clock on line 21 and the data input signal on line 23 are coupled to SIPO circuit 136, which writes the input data to RAM 34 (not shown) at each input clock pulse. Output clock on line 27 and data bus 133 are coupled to PISO circuit 134 which clocks out data pulses from RAM 34 on line 25 at each output clock pulse. Control circuitry 132 controls the reading and writing to the addresses of RAM 34 using address lines 135. Control circuitry 132 also receives frame information from the frame counters on the REF signal lines 72 and 81, and status information (such as an OOFP signal) from status bus 48. If the input and output clocks have different frequencies (which can occur due to signal delays from components in the circuit), then the RAM buffer is either being emptied or the buffer is being filled up. When the buffer is being emptied, the output clock is pulling data out faster than the input clock is pushing data in. Once the buffer is emptied to a certain point (preferably when all data has been emptied out of the buffer), control circuitry 132 repeats the last frame of data to compensate for the difference in clock frequencies. Similarly, when the buffer is being filled, the output clock is pulling data out slower than the input clock is pushing data in. Once the buffer is about to overflow, control circuitry 132 discards a frame of data to compensate for the difference in clock frequencies and outputs a "SLIP" status signal to terminating apparatus 26 to indicate such a discard has taken place. The SLIP signal can be sent to terminating apparatus along line 29 with signalling information, or a separate status bus can be connected between the microprocessor 41 and the terminating apparatus to relay the SLIP signal and any other status signals needed by the terminating apparatus 26. Alternatively, if the terminating apparatus 26 includes its own microprocessor, a separate status bus can be connected between control registers 40 (FIG. 5) and teminating apparatus 26 to send SLIP and other signals.

Referring back to FIG. 5, output frame counter 80 is similar to input frame counter 64. Counter 80 is a 13-bit counter in the described embodiment, and receives the frame aligning signal on bus 50. As in input frame counter 64, output frame counter 80 is reset to zero when the frame aligning pulse is high. Counter 80 counts the current bit number in the least significant 8 bits, and counts the frame number in the most significant 5 bits. Counter 80, however, counts according to the output clock on line 27, and thus tracks the framing bits of the output signal on line 25. Each time that counter 80 is reset indicates a framing bit is present on the input data signal, which triggers a frame synchronization signal to be output on line 28. Terminating apparatus 26 uses this frame synchronization signal to determine the location of framing bits in the output data signal on line 25. Output frame counter 80 also provides bit number and frame number information in a frame reference signal sent to signal extract circuitry 82.

Signal extract circuitry 82 uses the frame reference signal from output frame counter 80 and the output data signal on line 25 to extract signalling information from the framing bits. For example, in SF format, framing bits in frames 6 and 12 are designated signalling bits, and can be used to transmit information from one phone operator to another. Signal extract circuitry 82 must know the format of the framed data; it receives this information from the microprocessor over status bus 48. The extracted signalling information is output to terminating apparatus 26 on line 29. Circuitry for extracting signalling information from a data signal is well known to those skilled in the art.

Figure 9:
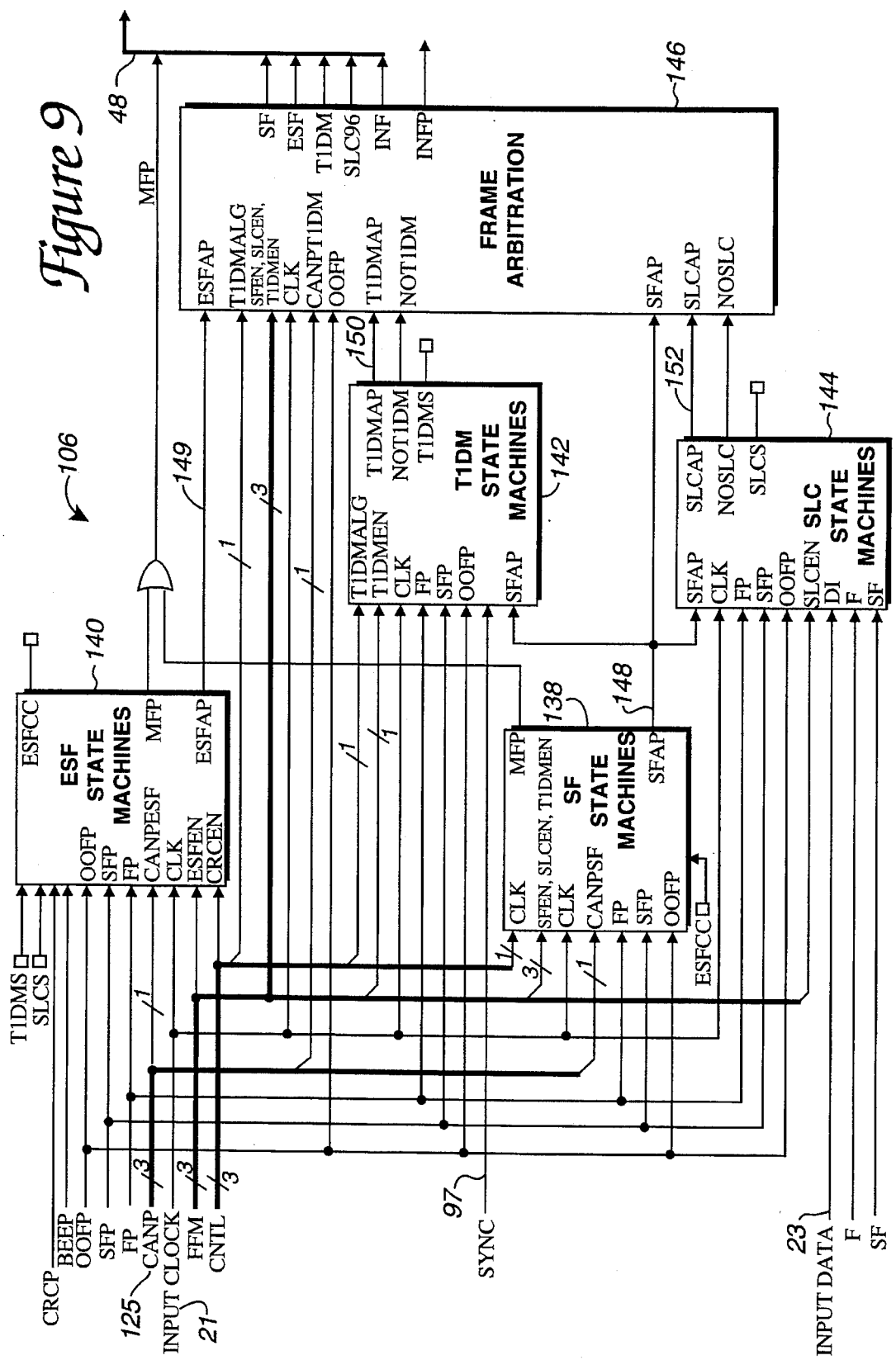
FIG. 9 is a block diagram of a preferred frame controller of the present invention.

FIG. 9 is a schematic diagram of a preferred embodiment of frame controller 106. Frame controller 106 includes SF state machine block 138, ESF state machine block 140, T1DM state machine block 142, SLC state machine block 144, and frame arbitrator block 146. Other state machine blocks can be included for additional framing formats in other embodiments.

Several signals are received by frame controller 106. Many of the signals are set by the user or are provided for user reference. Signals SFEN, ESFEN, T1DMEN, and SLCEN on the FFM bus are enable signals that are sent by the microprocessor on the status bus and are set high if the user wishes to enable that frame format. Signals CRCP and BEEP are sent on the status bus from CRC monitor 68 when frame 24, bit 192 is reached. A CRCP high signal indicates that a CRC check has been passed, and a BEEP high signal indicates that a CRC check has been failed. The CNTL bus signals are sent from the microprocessor 41 along the status bus 48 to provide user selection signals such as CRCEN to enable the CRC check for ESF, and T1DMALG to set the T1DM algorithm. In the preferred embodiment, the T1DM framing can be set to one of two algorithms: 1) both the SF framing format and the SYNC byte must be matched before T1DM framing is declared; or, 2) the SYNC byte must be matched before T1DM framing is declared. Signals F (frame number), SF (superframe number), FP (frame pulse) and SFP (superframe pulse) are sent by the input frame counter 64 on bus S1 as shown in FIG. 6. The out-of-frame pulse (OOFP) signal is sent by frame monitor 66 on status bus 48 to indicate if the data is out of frame. The INPUT DATA and INPUT CLK signals are input on lines 23 and 21, respectively, as shown in FIG. 5. Other signals can also be input to the frame controller 106 as needed; for example, a RESET signal can be used by an operator to reset the state machines back to their initial states.

An example of logic instructions for the state machine blocks 140–146 are shown in Appendices D–H. Logic instructions used for the state machines are preferably implemented using a state machine description file and, for example, the programming language Abel or the COMPASS Logic Synthesizer by COMPASS Design Automation. The logic is implemented with well-known logic gates.

SF state machine block 138 includes several different state machines, as shown in Appendix D. The process begins at state s0. Briefly, if, in state s0, the SF candidate pulse on line 122 (CANPSF) is true (high), and if other user signals are also as shown (where !VARIABLE means NOT VARIABLE, i.e., the signal is low), then the process continues to state s1. If these conditions are not met, the process waits in state s0 until the conditions are met. In state s1, the frame pulse FP and candidate pulse CANPSF are examined. If FP is true, indicating that the current pulse is the beginning of a frame, and if CANPSF is true, indicating that an SF pattern was matched, then the SF state machine block 130 outputs a high ("1") signal (SFAP) from the SFAP port on line 148 to frame arbitrator 146, and goes to state s3. State s3 continuously repeats by looping back to s3 at every dock pulse until an OOFP signal is true; once OOFP is true, the process loops back to state s0 (the second line of state s3 indicates that if any condition not otherwise listed in state s3 exists, then the process loops back to state s3 and outputs an SFAP signal of 0).

If FP is not true or CANPSF is not true at state s1, then the process goes to state s2 and also outputs a mimic frame signal MFP, indicating to the microprocessor that two or more framing formats might have been recognized. State s2 waits for both FP and CANPSF to be true, and then sends out the SFAP signal to frame arbitrator 146. The process then goes to state s3 as explained above. If a superframe pulse (SFP) goes high in either state s1 or s2, the process loops back to state s0. The SFP condition is used so that the process will not sit in one state for too many clock cycles.

ESF state machine block 140 functions similarly to SF state machine block 138 and uses the ESF state machine code shown in Appendix E. In state s0, the candidate pulse CANPESF and enable signal ESFEN are checked if they are high, and the T1DMS and SLCS signals are checked if they are low. The T1DMS and SLCS "search" signals are high if T1DM or SLC-96 formats, respectively, are close to being matched, and are used to put the ESF state machines on hold. Once the state s0 conditions are met, state s1 is implemented, in which the frame pulse FP and CANPESF are checked if they are high. If the CRC check is disabled (CRCEN=low) and FP and CANPESF are high, then the ESF state machine block 140 outputs the ESFAP signal to the frame arbitrator 146 on line 149. If the CRC check is enabled, state s4 is implemented. States s4 through s6 check if the CRCP signal is high; if so, the ESFAP signal is output to frame arbitrator 146. Once the ESFAP signal is output, the process loops to state s3; once an OOFP signal is received high, the process goes to state s0.

If either of the FP or CANPESF signals are low in state s1, the process continues to state s2, where the FP and CANPESF signals are checked once more for data verification. If a superframe pulse (SFP) goes high in either state s1 or s2, the process loops back to state s0 in a similar fashion as described in the SF state machine block. The ESFCC signal, if high, indicates to the SF block 138 that a CRC check is in progress for the ESF format.

T1DM state machine block 142 uses the TiDM state machines shown in Appendix F. In state s0, an SFAP signal from SF state machine block 138 is checked if it is high and other user control signals are checked. If the conditions are met, the process goes to state s1 and a T1DMS signal is output to ESF block 140 (and to any other framing format state machine blocks used besides SF and SLC). In state s1, the FP signal and the SYNC signal from shift register 96 are checked; if they are high, the process goes to the next state (s2). States s3 through s6 are similar to state s1 in that they all check if FP and SYNC are high to make sure the SYNC byte has been matched. In state s6, the T1DMAP signal is output to frame arbitrator 146 on line 150. If the SFP signal goes high anywhere in states s1 through s6, a NOT1DM signal is output to frame arbitrator 146 and the T1DMS signal is set low. Finally, in state s7, the process waits for the OOFP signal to go high so that the process may go back to state s0 and set NOT1DM to 0.

SLC state machine block 144 preferably uses the SLC state machine code shown in Appendix G. In state 0, the SFAP signal is checked if high and the SLCEN (enable) signal is checked if high. If these conditions are met, the process goes to state s1 and SLCS is set high; if the conditions are not met, s0 is repeated and a NOSLC signal is set low and output to frame arbitrator 146. In state s1, the FP signal, superframe number (SF), frame number (F) and current input data signal are checked. If these signals match specific conditions/values that indicate the presence of an SLC-96 format (as shown in Appendix G), the process goes to state s2, where further SF and F values are checked. If an SLC-96 format is indicated, the SLCAP signal is output high to frame arbitrator 146 on line 152 and the process goes to state s3. If an SLC-96 format is not indicated, the NOSLC signal is set high and output to frame arbitrator 146. The process then continues similarly to the above-described state machine blocks.

Frame arbitrator 146 preferably uses the state machine code shown in Appendix H. In state s0, the frame arbitrator checks for an ESFAP signal (indicating an ESF format); CANPT1DM, T1DMEN and T1DMALG signals (indicating a T1DM format); and a SFAP, (low)SLCEN and (low)T1DMEN signals (indicating an SF format). A high SFAP signal combined with other shown signals indicates the format might be SF, T1DM, or SLC-96, so that states s1 or s2 must be processed. In state s1, a T1DM format is indicated if the T1DMAP is high; SF or SLC-96 might be matched if the other shown signals are present. In state s2, an SLC-96 format is indicated if the SLCAP signal is high; an SF format or no format is otherwise indicated as shown. Once the framing format is indicated, state s3 is processed, which waits for a OOFP signal before going back to state s0.

If a particular framing format is indicated, the appropriate signal INF is sent on status bus 48 indicating that the input data has been framed according to a framing format. Also, the frame aligning signal INFP is set high and output on AL bus 50 to input frame counter 64 and output frame counter 80 to synchronize the counters with the framing format.

Figure 10:
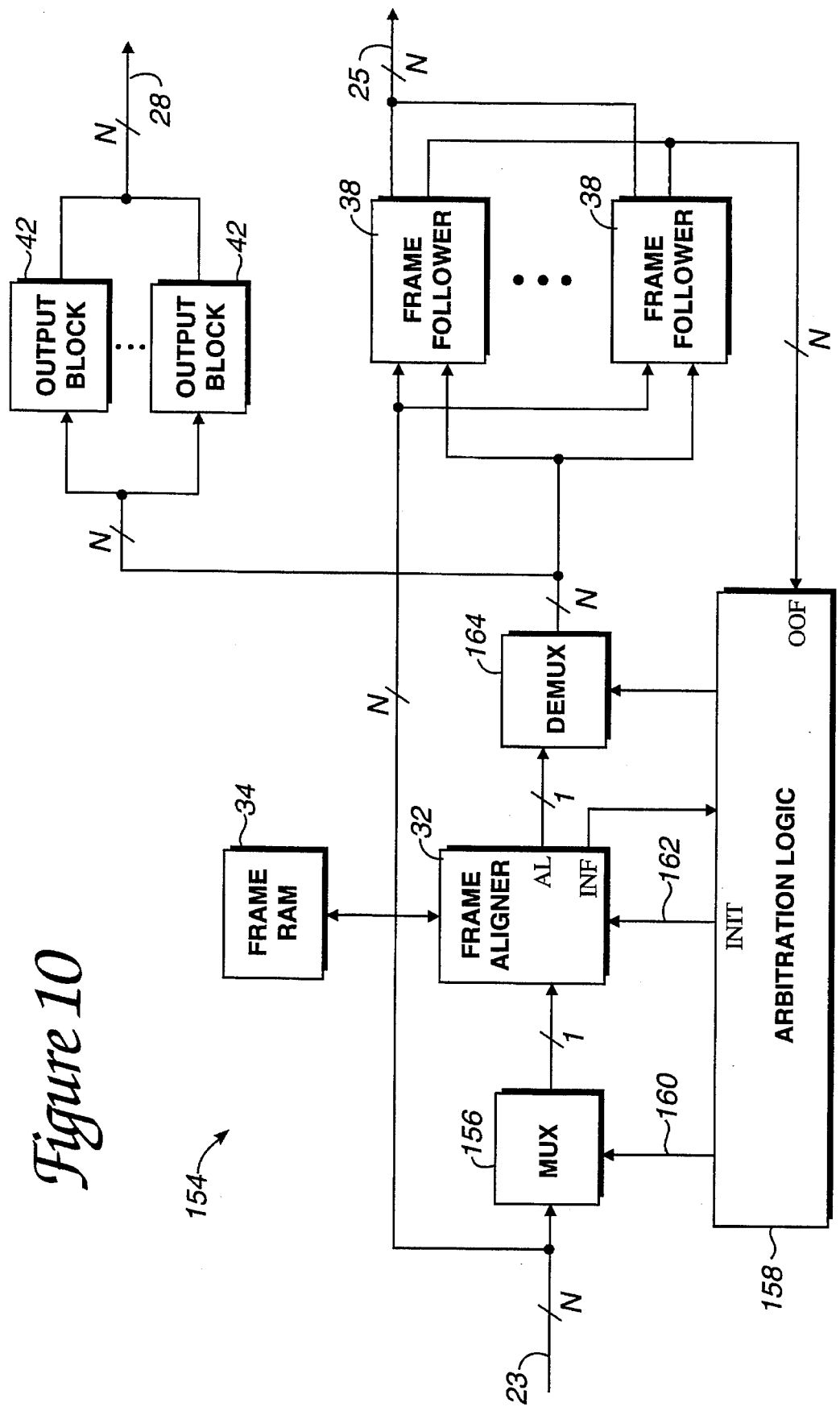
FIG. 10 is a block diagram of a framing apparatus used with multiple input data lines.

FIG. 10 is a schematic diagram showing a preferred apparatus 154 to frame multiple T1 data lines. N input data lines 23 are connected to a multiplexer 156. Arbitration logic block 158 (which can be implemented within microprocessor 41 or as separate circuitry) sends control signals on line 160 to queue the input data signals and select one at a time to enter frame aligner 32. Frame aligner 32 begins framing the data at the prompting of the INIT signal from the arbitration logic 158 on line 162. Frame aligner 32 sends an in-frame (INF) signal to the arbitration logic 158 when the input signal has been framed, and a frame aligning signal output from frame aligner 32 is sent to demultiplexer 164. Demultiplexer 164 receives a control signal from arbitration logic 158 to send the aligning signal to one of N frame followers 38. Each frame follower 38 corresponds to an input data signal 23. The receiving frame follower monitors the framing bits of the input signal as described with reference to FIG. 5. Each frame follower block 38 also preferably includes elastic store circuitry as described in FIG. 8 as well as a small elastic RAM; for example, a 48×8 sized RAM can be used. Since frame RAM 34 is used for aligning the signals (i.e., storing count values), each frame follower includes a small amount of RAM to buffer and synchronize the input signal rate with the output signal rate.

Each frame follower 38 thus provides its own output data signal 25 which is coupled to one or more terminating apparatus 26. The frame aligning signal is also sent to one of N output blocks 42, each output block corresponding to an input data signal and functioning as described with reference to FIG. 5.

After the first input data signal 23 has been framed, the second input data signal in the queue is selected by arbitration logic 158, framed by frame aligner 32, and monitored and output by a frame follower 38. This continues for all the data signals held in queue until the Nth input signal is sent to the Nth frame follower 38. If the frame followers detect framing errors, an out-of-frame (OOF) signal is sent to arbitration logic 158, which can control the multiplexer 156 to queue in a particular input data signal. Arbitration logic 158 uses the INIT signal on line 162 to reset the frame aligner 32 and mask out the previous contents in frame RAM 34.

The advantage of the present invention is that only one frame aligner 32 and one frame RAM 34 are required to frame multiple input signals. For example, multiple T1 lines are often used to create higher levels of data lines, such as T2 data lines which are typically implemented by transmitting data through four T1 lines simultaneously, thereby achieving four times the data rate. The several components of the frame aligner and frame RAM of the present invention do not have to be duplicated to frame multiple digital data signals, saving time and expense.

While this invention has been described in terms of several preferred embodiments, it is contemplated that alterations, modifications and permutations thereof will become apparent to those skilled in the art upon a reading of the specification and study of the drawings. It is intended that the claims include all such alterations, modifications and permutations as fall within the spirit and scope of the present invention.

APPENDIX A

SF Pattern Recognizer Logic

Inputs:        INP (input data signal)
                      SF (value retrieved from frame RAM)
    Outputs:     NEW_SF (value stored back into frame RAM)
                      F (frame number loaded into frame counters)

```
 1    IF INP = 1 AND SF = 0    THEN    NEW_SF = 1,  F = 1
      IF INP = 0 AND SF = 1    THEN    NEW_SF = 2,  F = 2
      IF INP = 0 AND SF = 2    THEN    NEW_SF = 3,  F = 3
      IF INP = 0 AND SF = 3    THEN    NEW_SF = 4,  F = 4
 5    IF INP = 1 AND SF = 4    THEN    NEW_SF = 5,  F = 5
      IF INP = 1 AND SF = 5    THEN    NEW_SF = 6,  F = 6
      IF INP = 0 AND SF = 6    THEN    NEW_SF = 7,  F = 7
      IF INP = 1 AND SF = 7    THEN    NEW_SF = 8,  F = 8
      IF INP = 1 AND SF = 8    THEN    NEW_SF = 9,  F = 9
10    IF INP = 1 AND SF = 9    THEN    NEW_SF = 10, F = 10
      IF INP = 0 AND SF = 10   THEN    NEW_SF = 11, F = 11
      IF INP = 0 AND SF = 11   THEN    NEW_SF = 12, F = 12
      IF INP = 1 AND SF = 12   THEN    NEW_SF = 13, F = 1
      IF INP = 0 AND SF = 13   THEN    NEW_SF = 14, F = 2
15    IF INP = 0 AND SF = 14   THEN    NEW_SF = 15, F = 3
      IF INP = 0 AND SF = 15   THEN    NEW_SF = 16, F = 4
      IF INP = 1 AND SF = 16   THEN    NEW_SF = 17, F = 5
      IF INP = 1 AND SF = 17   THEN    NEW_SF = 18, F = 6
      IF INP = 0 AND SF = 18   THEN    NEW_SF = 19, F = 7
20    IF INP = 1 AND SF = 19   THEN    NEW_SF = 20, F = 8
      IF INP = 1 AND SF = 20   THEN    NEW_SF = 21, F = 9
      IF INP = 1 AND SF = 21   THEN    NEW_SF = 22, F = 10
      IF INP = 0 AND SF = 22   THEN    NEW_SF = 23, F = 11
24    IF INP = 0 AND SF = 23   THEN    NEW_SF = 0,  F = 12

25    IF INP = 0 AND SF = 0    THEN NEW_SF = 0
      IF INP = 1 AND SF = 1    THEN NEW_SF = 1, F = 1
      IF INP = 1 AND SF = 2    THEN NEW_SF = 1, F = 1
      IF INP = 1 AND SF = 3    THEN NEW_SF = 1, F = 1
      IF INP = 0 AND SF = 4    THEN NEW_SF = 0
30    IF INP = 0 AND SF = 5    THEN NEW_SF = 0
      IF INP = 1 AND SF = 6    THEN NEW_SF = 1, F = 1
      IF INP = 0 AND SF = 7    THEN NEW_SF = 0
      IF INP = 0 AND SF = 8    THEN NEW_SF = 0
      IF INP = 0 AND SF = 9    THEN NEW_SF = 0
35    IF INP = 1 AND SF = 10   THEN NEW_SF = 1, F = 1
      IF INP = 1 AND SF = 11   THEN NEW_SF = 1, F = 1
      IF INP = 0 AND SF = 12   THEN NEW_SF = 0
      IF INP = 1 AND SF = 13   THEN NEW_SF = 1, F = 1
      IF INP = 1 AND SF = 14   THEN NEW_SF = 1, F = 1
40    IF INP = 1 AND SF = 15   THEN NEW_SF = 1, F = 1
      IF INP = 0 AND SF = 16   THEN NEW_SF = 0
      IF INP = 0 AND SF = 17   THEN NEW_SF = 0
      IF INP = 1 AND SF = 18   THEN NEW_SF = 1, F = 1
```

```
        IF INP = 0 AND SF = 19  THEN NEW_SF = 0
45      IF INP = 0 AND SF = 20  THEN NEW_SF = 0
        IF INP = 0 AND SF = 21  THEN NEW_SF = 0
        IF INP = 1 AND SF = 22  THEN NEW_SF = 1, F = 1
48      IF INP = 1 AND SF = 23  THEN NEW_SF = 1, F = 1
```

APPENDIX B

ESF Pattern Recognizer Logic

Inputs:     INP (input data)
                ESF (count value retrieved from frame RAM)
    Outputs:    NEW_ESF (count value stored back into frame RAM)
                F (value loaded into frame counters)

```
1     IF INP = 0 AND ESF = 0     THEN   NEW_ESF = 1,  F = 4
      IF INP = 0 AND ESF = 1     THEN   NEW_ESF = 2,  F = 8
      IF INP = 1 AND ESF = 2     THEN   NEW_ESF = 3,  F = 12
      IF INP = 0 AND ESF = 3     THEN   NEW_ESF = 4,  F = 16
5     IF INP = 1 AND ESF = 4     THEN   NEW_ESF = 5,  F = 20
      IF INP = 1 AND ESF = 5     THEN   NEW_ESF = 6,  F = 24
      IF INP = 0 AND ESF = 6     THEN   NEW_ESF = 7,  F = 4
      IF INP = 0 AND ESF = 7     THEN   NEW_ESF = 8,  F = 8
      IF INP = 1 AND ESF = 8     THEN   NEW_ESF = 9,  F = 12
10    IF INP = 0 AND ESF = 9     THEN   NEW_ESF = 10, F = 16
      IF INP = 1 AND ESF = 10    THEN   NEW_ESF = 11, F = 20
      IF INP = 1 AND ESF = 11    THEN   NEW_ESF = 12, F = 24
      IF INP = 0 AND ESF = 12    THEN   NEW_ESF = 13, F = 4
      IF INP = 0 AND ESF = 13    THEN   NEW_ESF = 14, F = 8
15    IF INP = 1 AND ESF = 14    THEN   NEW_ESF = 15, F = 12
      IF INP = 0 AND ESF = 15    THEN   NEW_ESF = 16, F = 16
      IF INP = 1 AND ESF = 16    THEN   NEW_ESF = 17, F = 20
      IF INP = 1 AND ESF = 17    THEN   NEW_ESF = 18, F = 24
      IF INP = 0 AND ESF = 18    THEN   NEW_ESF = 19, F = 4
20    IF INP = 0 AND ESF = 19    THEN   NEW_ESF = 20, F = 8
      IF INP = 1 AND ESF = 20    THEN   NEW_ESF = 21, F = 12
      IF INP = 0 AND ESF = 21    THEN   NEW_ESF = 22, F = 16
      IF INP = 1 AND ESF = 22    THEN   NEW_ESF = 23, F = 20
24    IF INP = 1 AND ESF = 23    THEN   NEW_ESF = 0,  F = 24

25    IF INP = 1 AND ESF = 0     THEN NEW_ESF = 0
      IF INP = 1 AND ESF = 1     THEN NEW_ESF = 0
      IF INP = 0 AND ESF = 2     THEN NEW_ESF = 2, F = 8
      IF INP = 1 AND ESF = 3     THEN NEW_ESF = 0
      IF INP = 0 AND ESF = 4     THEN NEW_ESF = 2, F = 8
30    IF INP = 0 AND ESF = 5     THEN NEW_ESF = 1, F = 4
      IF INP = 1 AND ESF = 6     THEN NEW_ESF = 0
      IF INP = 1 AND ESF = 7     THEN NEW_ESF = 0
      IF INP = 0 AND ESF = 8     THEN NEW_ESF = 2, F = 8
      IF INP = 1 AND ESF = 9     THEN NEW_ESF = 0
35    IF INP = 0 AND ESF = 10    THEN NEW_ESF = 2, F = 8
      IF INP = 0 AND ESF = 11    THEN NEW_ESF = 1, F = 4
      IF INP = 1 AND ESF = 12    THEN NEW_ESF = 0
      IF INP = 1 AND ESF = 13    THEN NEW_ESF = 0
      IF INP = 0 AND ESF = 14    THEN NEW_ESF = 2, F = 8
40    IF INP = 1 AND ESF = 15    THEN NEW_ESF = 0
      IF INP = 0 AND ESF = 16    THEN NEW_ESF = 2, F = 8
      IF INP = 0 AND ESF = 17    THEN NEW_ESF = 1, F = 4
      IF INP = 1 AND ESF = 18    THEN NEW_ESF = 0
      IF INP = 1 AND ESF = 19    THEN NEW_ESF = 0
```

```
45    IF INP = 0 AND ESF = 20   THEN NEW_ESF = 2, F = 8
      IF INP = 1 AND ESF = 21   THEN NEW_ESF = 0
      IF INP = 0 AND ESF = 22   THEN NEW_ESF = 2, F = 8
48    IF INP = 0 AND ESF = 23   THEN NEW_ESF = 1, F = 4
```

APPENDIX C

T1DM Pattern Recognizer Logic

Inputs:   INP (input data)
          SYNC (signal from shift register if sync byte matches)
          T1DM (value retrieved in frame RAM)
          SF (count value stored for SF pattern)
Outputs:  NEW_T1DM (value stored back into frame RAM)

```
1   IF INP=1 AND T1DM=0 AND SYNC=1 AND SF=0 THEN NEW_T1DM=1
    IF INP=0 AND T1DM=1 AND SYNC=1 AND SF=1 THEN NEW_T1DM=1
    IF INP=0 AND T1DM=1 AND SYNC=1 AND SF=2 THEN NEW_T1DM=1
    IF INP=0 AND T1DM=1 AND SYNC=1 AND SF=3 THEN NEW_T1DM=1
5   IF INP=1 AND T1DM=1 AND SYNC=1 AND SF=4 THEN NEW_T1DM=1
    IF INP=1 AND T1DM=1 AND SYNC=1 AND SF=5 THEN NEW_T1DM=1
    IF INP=0 AND T1DM=1 AND SYNC=1 AND SF=6 THEN NEW_T1DM=1
8   IF INP=1 AND T1DM=1 AND SYNC=1 AND SF=7 THEN NEW_T1DM=1
```

APPENDIX D

SF STATE MACHINE LOGIC

```
SM SF_FORMAT
CLOCK cp 20
 #define inputs
   inputs CANPSF OOFP SFP FP SFEN T1DMEN T1DMALG SLCEN
     ESFCC;
 #define outputs
  RS=0 outputs MFP SFAP;

state s0
   IF CANPSF AND (SFEN OR (T1DMEN AND !T1DMALG) OR SLCEN)
     AND !ESFCC THEN s1;

state s1
   IF FP AND CANPSF THEN s3 SFAP=1,
   IF !FP AND CANPSF THEN s2 MFP =1,
   IF FP AND !CANPSF THEN s2 MFP=1,
   IF SFP THEN s0 MFP=0;

state s2
   IF FP AND CANPSF THEN s3 SFAP=1 MFP=0,
   IF SFP THEN s0 MFP=0
         THEN s2 SFAP=0;

state s3
   IF OOFP THEN s0 MFP=0
         THEN s3 SFAP=0;

end SF_FORMAT
```

APPENDIX E

ESF STATE MACHINE LOGIC

```
SM ESF_FORMAT
 CLOCK cp 20
  #define inputs
   inputs CANPESF OOFP SFP FP BEEP CRCP CRCEN ESFEN T1DMS
    SLCS;
  #define outputs
   outputs ESFAP=0;
   RS=0 outputs MFP ESFCC;

state s0
   IF CANPESF AND ESFEN AND !T1DMS AND !SLCS THEN s1;

state s1
   IF FP AND CANPESF AND !CRCEN THEN s3 ESFAP=1,
   IF FP AND CANPESF AND CRCEN THEN s4 ESFCC=1,
   IF !FP AND CANPESF THEN s2 MFP=1,
   IF FP AND !CANPESF THEN s2 MFP=1,
   IF SFP THEN s0 MFP=0;

state s2
   IF FP AND CANPESF AND !CRCEN THEN s3 ESFAP=1 MFP=0,
   IF FP AND CANPESF AND CRCEN THEN s4 ESFCC=1,
   IF SFP THEN s0 MFP=0;

state s3
   IF OOFP THEN s0 MFP=0 ESFCC=0;

state s4
   IF CRCP THEN s3 ESFAP=1 MFP=0 ESFCC=0,
   IF BEEP THEN s5 ESFCC=1;

state s5
   IF CRCP THEN s3 ESFAP=1 MFP=0 ESFCC=0
   IF BEEP THEN s6 ESFCC=1;

state s6
   IF CRCP THEN s3 ESFAP=1 MFP=0 ESFCC=0,
   IF BEEP THEN s0 MFP=0 ESFCC=0;

end ESF_FORMAT
```

APPENDIX F

T1DM STATE MACHINE LOGIC

```
SM T1DM_FORMAT
CLOCK cp 20
 #define inputs
   inputs SFAP OOFP SFP FP T1DMEN SYNC T1DMALG;
 #define outputs
   RS=0 outputs NOT1DM T1DMAP T1DMS;

state s0
   IF SFAP AND (T1DMEN AND !T1DMALG) THEN s1 T1DMS =1;

state s1
   IF FP AND SYNC THEN s2,
   IF SFP THEN s7 NOT1DM=1 T1DMS=0;

state s2
   IF FP AND SYNC THEN s3,
   IF SFP THEN s7 NOT1DM=1 T1DMS=0;

state s3
   IF FP AND SYNC THEN s4,
   IF SFP THEN s7 NOT1DM=1 T1DMS=0;

state s4
   IF FP AND SYNC THEN s5,
   IF SFP THEN s7 NOT1DM=1 T1DMS=0;

state s5
   IF FP AND SYNC THEN s6,
   IF SFP THEN s7 NOT1DM=1 T1DMS=0;

state s6
   IF FP AND SYNC THEN s7 T1DMAP=1 T1DMS=0,
   IF SFP THEN s7 NOT1DM=1 T1DMS=0;

state s7
   IF OOFP THEN s0 NOT1DM=0 T1DMS=0,
             THEN s7 T1DMAP=0 T1DMS=0;

end T1DM_FORMAT;
```

APPENDIX G

SLC-96 STATE MACHINE LOGIC

```
SM SLC_FORMAT
 CLOCK cp 20
 #define inputs
  inputs INP SFAP OOFP SFP FP SLCEN F[5:0] SF[2:0];
 #define outputs
  RS=0 outputs NOSLC SLCAP SLCS;

state s0
  IF SFAP AND SLCEN THEN s1 SLCS=1,
                    THEN s0 NOSLC=0;

state s1
  IF FP AND SF=4(hex) AND F=10 AND !INP THEN s2,
  IF FP AND SF=4(hex) AND F=10 AND INP THEN s0 NOSLC=1
    SLCS=0
  IF OOFP THEN s0 SLCS=0 NOSLC=1;

state s2
  IF FP AND SF=4(hex) AND F=12 AND INP THEN s3 SLCAP=1
    SLCS=0,
  IF FP AND SF=4(hex) AND F=12 AND !INP THEN s0 NOSLC=1
    SLCS=0,
  IF OOFP THEN s0 SLCS=0 NOSLC=0;

state s3
  IF OOFP THEN s0 SLCAP=0 NOSLC=0 SLCS=0,
          THEN s3 SLCAP=0;

end SLC_FORMAT;
```

APPENDIX H

FRAME ARBITRATOR STATE MACHINE LOGIC

```
SM ARB
 CLOCK cp 20
 #define inputs
  inputs SFAP CANPT1DM T1DMEN T1DMALG T1DMAP SLCAP ESFAP
    NOT1DM SFEN NOSLC OOFP SLCEN;
 #define outputs
  RS=0 outputs T1DM SLC SF ESF INF INFP;

state s0
  IF ESFAP THEN s3 ESF=1 INFP=1 INF=1,
  IF CANPT1DM AND (T1DMEN AND T1DMALG) THEN s3 T1DM=1
    INFP=1 INF=1,
  IF SFAP AND !SLCEN AND !T1DMEN THEN s3 SF=1 INFP=1
    INF=1,
  IF SFAP AND (T1DMEN AND !T1DMALG) THEN s1,
  IF SFAP AND SLCEN THEN s2;

state s1
  IF NOT1DM AND SLCEN THEN s2,
  IF NOT1DM AND !SLCEN AND !SFEN THEN s0,
  IF NOT1DM AND !SLCEN AND SFEN THEN s3 SF=1 INFP=1
    INF=1,
  IF T1DMAP THEN s3 T1DM=1 INFP=1 INF=1;

state s2
  IF NOSLC AND !SFEN THEN s0,
  IF NOSLC AND SFEN THEN s3 SF=1 INFP=1 INF=1,
  IF SLCAP THEN s3 SLC=1 INFP=1 INF=1;

state s3
  IF OOFP THEN s0 T1DM=0 SF=0 SLC=0 ESF=0 INF=0,
          THEN s3 INFP=0;

end ARB;
```

What is claimed is:

1. A frame alignment apparatus comprising:

a plurality of pattern recognizers coupled to an input signal, said input signal including data and framing information, wherein at least one of said plurality of pattern recognizers recognizes a pattern of framing information on said input signal that is associated with a recognized framing format, wherein each of said pattern recognizers is operative to recognize a different pattern from said other pattern recognizers, each pattern being associated with at least one of a plurality of different, predetermined framing formats, and wherein each of said plurality of pattern recognizers outputs a count signal;

a storage apparatus coupled to said plurality of pattern recognizers and receiving said count signal from each of said pattern recognizers, said storage apparatus storing a plurality of counts, each count indicating a correspondence of a portion of said data and framing information to one of said different framing formats associated with said count, the values of said counts being based on said count signals; and a frame controller coupled to said pattern recognizers and receiving a signal from each of said pattern recognizers that is derived from said count signal, said frame controller outputting an indication of said recognized framing format and a frame aligning signal for indicating which of said data and said framing information is framing information.

2. A frame alignment apparatus as recited in claim 1 wherein said pattern recognizers each include at least one state machine programmed to recognize a pattern of framing information corresponding to one of said plurality of different framing formats.

3. A frame alignment apparatus as recited in claim 2 wherein said plurality of pattern recognizers includes pattern recognizers for recognizing patterns corresponding to superframe, extended superframe, T1 data multiplexer, and SLC-96 flaming formats.

4. A frame alignment apparatus as recited in claim 1 wherein each of said plurality of counts stored by said storing apparatus is an amount of data or flaming bits having values that correspond to a pattern associated with at least one of said predetermined framing formats.

5. A frame alignment apparatus as recited in claim 4 wherein said input signal is organized into a pattern of frames forming a plurality of bit streams, wherein each frame includes a plurality of consecutive data bits followed by at least one framing bit, find wherein each of said plurality of counts is associated with one of said bit streams, said counts simultaneously determining which of said bit streams includes said framing bits.

6. A frame alignment apparatus as recited in claim 5 further comprising a comparator for comparing the value of each of said plurality of counts with a predetermined value for each bit of said input signal to recognize one of said plurality of predetermined framing formats, wherein a first of said counts to be incremented to said predetermined value identifies said recognized framing format.

7. A frame alignment apparatus as recited in claim 6 wherein some of said pattern recognizers recognize said pattern over frames of different bit lengths than other pattern recognizers as required by said associated framing formats.

8. A frame alignment apparatus as recited in claim 5 wherein each of said plurality of counts is associated with at least one of said framing formats such that said plurality of counts identify said recognized framing format, and wherein said frame controller outputs a signal indicating said recognized framing format.

9. A frame alignment apparatus as recited in claim 1 wherein each of said count signals includes a current value of an associated count, and wherein said value of said associated count is set to said current value of said count signal.

10. A frame alignment apparatus as recited in claim 1 wherein a particular pattern, when recognized in said data and framing information, identifies at least two different possible framing formats to which said framing information corresponds, such that said frame controller further analyzes said framing information to determine said recognized framing format.

11. A method for framing data on a digital transmission line comprising:

outputting an output signal in accordance with an external output clock, said output signal derived from an input signal, said output signal and said input signal including data and framing information bits;

analyzing said data and framing information bits in said input signal to determine which of said data and framing information bits are framing information bits and to recognize one of a plurality of possible different predetermined framing formats created by said framing information bits in said input signal; and counting data and framing information bits present on said input signal and outputting a frame synchronization signal in accordance with said output clock when said framing information bits are counted.

12. A method for flaming data as recited in claim 11 wherein said step of analyzing said data and framing information bits and recognizing a framing format includes:

comparing said data and flaming information bits to a plurality of predetermined framing patterns, each of said flaming patterns being associated with at least one of said plurality of framing formats;

storing a plurality of counts, each count indicative of a number of data and flaming information bits corresponding to one of said framing patterns;

utilizing said counts to determine a flaming format to which said framing information bits correspond.

13. A method for flaming data as recited in claim 12 further comprising the step of utilizing said counts to distinguish said framing information bits from said data information bits in said input signal.

14. A method as recited in claim 13 further comprising a step of checking for errors in said framing information bits as compared to said predetermined framing pattern after said recognized framing format has been determined.

15. A method as recited in claim 14 wherein said flaming information bits include signalling information content, and further comprising the step of extracting said signalling information content from said flaming information bits and outputting said signalling information content.

16. A frame alignment apparatus as recited in claim 12 wherein said data and framing information is organized into frames, wherein each frame includes a predetermined number of data and framing bits such that a bit stream is provided for each bit position of said frames, and wherein one of said counts is stored for each of said bit streams of said input signal and for each of said possible predetermined framing formats.

17. A frame alignment apparatus as recited in claim 16 wherein said step of utilizing said counts to determine a framing format includes incrementing a particular one of said counts if a successive bits of said bit stream corresponding to said particular count match said framing pattern, such that a first of said counts to be incremented to a predetermined threshold identifies said recognized framing format and distinguishes said framing bits from said data bits.

18. A frame alignment apparatus as recited in claim 11 wherein an indication of said recognized framing format is output in said outputting step.

19. A digital reception apparatus comprising:
   means for receiving data and framing information bits in a digital transmission of information, wherein said data information bits are organized in frames, and wherein said framing information bits designate different frames of said data information bits;
   means for determining one of a plurality of possible framing formats from said data and framing information bits by determining which of said data and framing information bits are framing information bits; and
   means for outputting said data and framing information bits and a frame synchronization signal, said frame synchronization signal being output when said framing information bits are output which identifies said different frames of said output data information bits.

20. A digital reception apparatus as recited in claim 19 further comprising:
   means for receiving data and framing information bits in a plurality of simultaneous digital transmissions, each digital transmission including data and framing information bits; and
   a corresponding plurality of said means for outputting, wherein said means for determining one of a plurality of possible framing formats determines a framing format for each of said transmissions.

21. A digital reception apparatus as recited in claim 19 wherein said means for determining one of a plurality of possible framing formats includes means for simultaneously storing a plurality of counts, wherein a count is incremented when an associated bit position in successive frames of said input signal matches a predetermined pattern associated with one of said plurality of framing formats associated with each of said counts.

22. A digitial reception apparatus as recited in claim 21 wherein said means for determining compares values of said counts to a predetermined threshold such that a first of said counts to be incremented to said threshold identifies a framing bit position in said input signal and determines said framing format of said data and framing bits.

23. A method for digital reception comprising:
   receiving data and framing bits in a digital transmission;
   determining which of said data and framing information bits are framing information bits and recognizing one of a plurality of possible framing formats created by said framing bits; and
   outputting an output signal including said data and framing bits and a frame synchronization signal, said frame synchronization signal being output when said framing bits are output in said output signal.

24. A method as recited in claim 23 further comprising:
   receiving data and framing bits in a plurality of simultaneous digital transmissions, each digital transmission including data and framing bits; and
   outputting at least said data and framing bits and a frame synchronization signal for each of said plurality of transmissions.

25. A method as recited in claim 23 wherein said data and framing information is organized into frames of equal amounts of bits, and wherein said step of determining one of a plurality of possible framing formats includes maintaining a count of bits matched to a pattern associated with one of said framing formats, wherein a plurality of said counts are simultaneously maintained, a separate count being included for each bit position of said frames and for each of a plurality of said possible framing formats.

* * * * *